(12) United States Patent
Kumpf et al.

(10) Patent No.: US 6,223,223 B1
(45) Date of Patent: Apr. 24, 2001

(54) NETWORK SCANNER CONTENTION HANDLING METHOD

(75) Inventors: David A. Kumpf, Rocklin; Glenn R. Garcia, Grass Valley; Dean L. Scoville, Auburn, all of CA (US); David L. Smith, Pittsburgh, PA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/163,496

(22) Filed: Sep. 30, 1998

(51) Int. Cl.⁷ .................................................. G06F 15/16
(52) U.S. Cl. ............................................ 709/227; 709/203
(58) Field of Search .................................... 709/227, 203, 709/223, 224, 201, 217, 218, 219; 710/8, 19

(56) References Cited

U.S. PATENT DOCUMENTS 5,913,088 * 6/1999 Moghadam et al. ................. 396/311
5,933,580 * 8/1999 Uda et al. ............................. 710/19
5,946,458 * 8/1999 Austin et al. ....................... 358/1.15
5,968,138 * 10/1999 Clough ................................. 710/8
6,101,555 * 8/2000 Goshey et al. ..................... 709/301

* cited by examiner

Primary Examiner—Mehmet B. Geckil

(57) ABSTRACT

A network peripheral support method including a client with a general purpose software capability and a server connected to the peripheral. The server of the present invention waits for a client to attempt to open a connection with the peripheral. The client sends a peripheral connection request via a data packet to the server, and the server accepts the connection. The server determines an availability of the peripheral and locks the peripheral so that it cannot be used by other clients. Thereafter, the server opens a connection with the peripheral, if it is available, and notifies the client of the peripheral availability. The server then waits for predetermined data from the client, which when received, results in the client having control of the peripheral for at least a first predetermined time period, and when received sends the data to the client. The server closes the connection with the client upon completion of sending the data to the client.

15 Claims, 5 Drawing Sheets

NETWORK SCANNER CONTENTION HANDLING METHOD

The present invention generally relates to software and firmware, i.e., software embedded on a system, and more particularly to software and firmware for supporting scanners over a network.

Scan peripheral vendors typically provide custom software that takes advantage of features of the product, however, the custom software is typically written to communicate only with a single device over a local interface, such as a SCSI bus or a parallel port. While the local interface design is simple, the design fails to address issues that occur when the peripheral is attached to a network. Thus, attached scanners cannot utilize the custom software and associated features.

A problem exists with scanners and other peripherals attached to the network since multiple users can access the peripherals. Scanners, for example, typically require some setup before starting an actual scan. If no controls are in place, contention between clients could occur where one client sends commands to set the scanner resolution, page size, and other options in preparation for starting a scan, at the same time another client is issuing similar commands to the same scanner. One client's commands could overwrite the commands of another client. Similarly, one client can send commands to reset the scanner while another client's scan is in progress, and effectively abort the other client's scan job.

Another problem exists in network scanning, when a scan connection is indefinitely held open by one client. While the connection remains open, other clients are unable to access the scanner. Thus, there is a need for a software that has a timeout and a recovery to keep any one client from tying up the scanner for too long.

Another problem exists with network scanning since the peripheral is usually centrally located and not visible to the client, device status is typically not readily available to a network client. With locally attached peripherals, peripheral status can usually be determined either visibly, due to the proximity of the peripheral, or by viewing error messages reported by the local operating system or local software. Thus, device error messages reported to an application running on one client's personal computer (PC) are not propagated to other clients'PCs on the network.

Accordingly, it is a primary object of the present invention to provide an improved server apparatus that can handle contention on the network.

Another object of the present invention is to provide such an improved apparatus which can recover to keep a client from tying up a scanner for too long on the network.

Yet another object of the present invention is to provide meaningful error messages to the client on the network.

Other objects and advantages will become apparent upon reading the following detailed description, in conjunction with the attached drawings.

SUMMARY OF THE INVENTION

The present invention is directed to an improved method in the form of software and firmware for supporting a scan peripheral over the network, whereby an improved server apparatus can handle network contention situations, and can provide a connectionless protocol for control data and a connection-oriented protocol for scan data. Additionally, the present invention provides an improved server that can recover from a client tying up, but not using a scanner for an extended period.

In one aspect of the present invention, the server waits for a client to attempt to open a connection with the peripheral. When the client sends a peripheral connection request via a data packet to the server, the server accepts the connection. The server determines an availability of the peripheral and locks the peripheral so that it cannot be used by other clients. Thereafter, the server opens a connection with the peripheral, if it is available, and notifies the client of the peripheral availability. The server then waits for predetermined data from the client, which when received, results in the client having control of the peripheral for at least a first predetermined time period, and when received sends the data to the client. The server closes the connection with the client upon completion of sending the data to the client.

TABLE OF ACRONYMS

This patent utilizes several acronyms. The following table is provided to aid the reader in determining the meaning of the several acronyms:

ASCII=American standard code for information interchange.
CPU=central processing unit.
ID=identification.
IHV=independent hardware vendor.
IP=internet protocol.
MFPDTF=multifunction peripheral data transfer format.
MIB=management information base.
PC=personal computer.
SAP=service advertising protocol.
SCL=scanner control language.
SLP=service location protocol.
SNMP=simple network management protocol.
SPX=sequenced packet exchange.
TCP=transmission control protocol.

DETAILED DESCRIPTION

Broadly stated, the present invention is directed to an improved method in the form of software and firmware for supporting a scan peripheral over the network. More particularly, the present invention is able to provide an improved server apparatus that can handle network contention situations, and can provide a connectionless protocol for control data and a connection-oriented protocol for scan data. Additionally, the present invention provides an improved server that can recover from a client tying up, but not using a scanner for an extended period.

Figure 1:
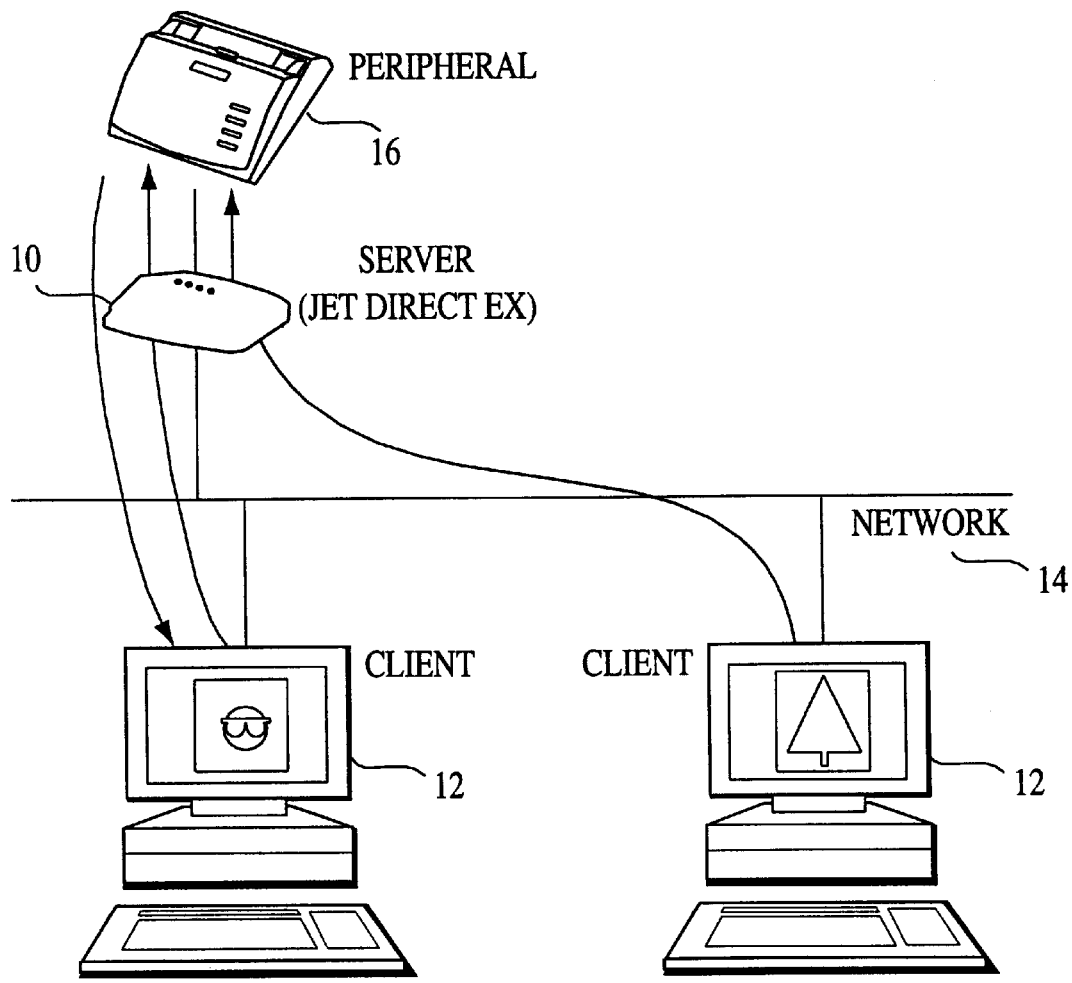
FIG. 1 is an overview of the network system.

Turning now to the drawings, and particularly FIG. 1, a server 10 waits for a client 12 on a network 14 to establish a connection with at least one peripheral 16. For purposes of the present invention, the peripheral 16 is a scanner. The server 10 of the present invention waits for the client 12 by listening for a network 14 scan connection on a scan port utilizing, for example, a transmission control protocol/internet protocol (TCP/IP) or sequenced packet exchange (SPX) protocol. While the server 10 referred to is used as part of a Hewlett-Packard JETDIRECT EX box package, it is contemplated that the server 10 can be part of a card that connects via a bus interface to the peripheral 16, or as part of an internal central processing unit (CPIJ) of the peripheral 16. The JETDIRECT EX box is shown and described in a Hewlett-Packard user manual, part no. 5967-2290, and is incorporated by reference herein.

Figure 2A:
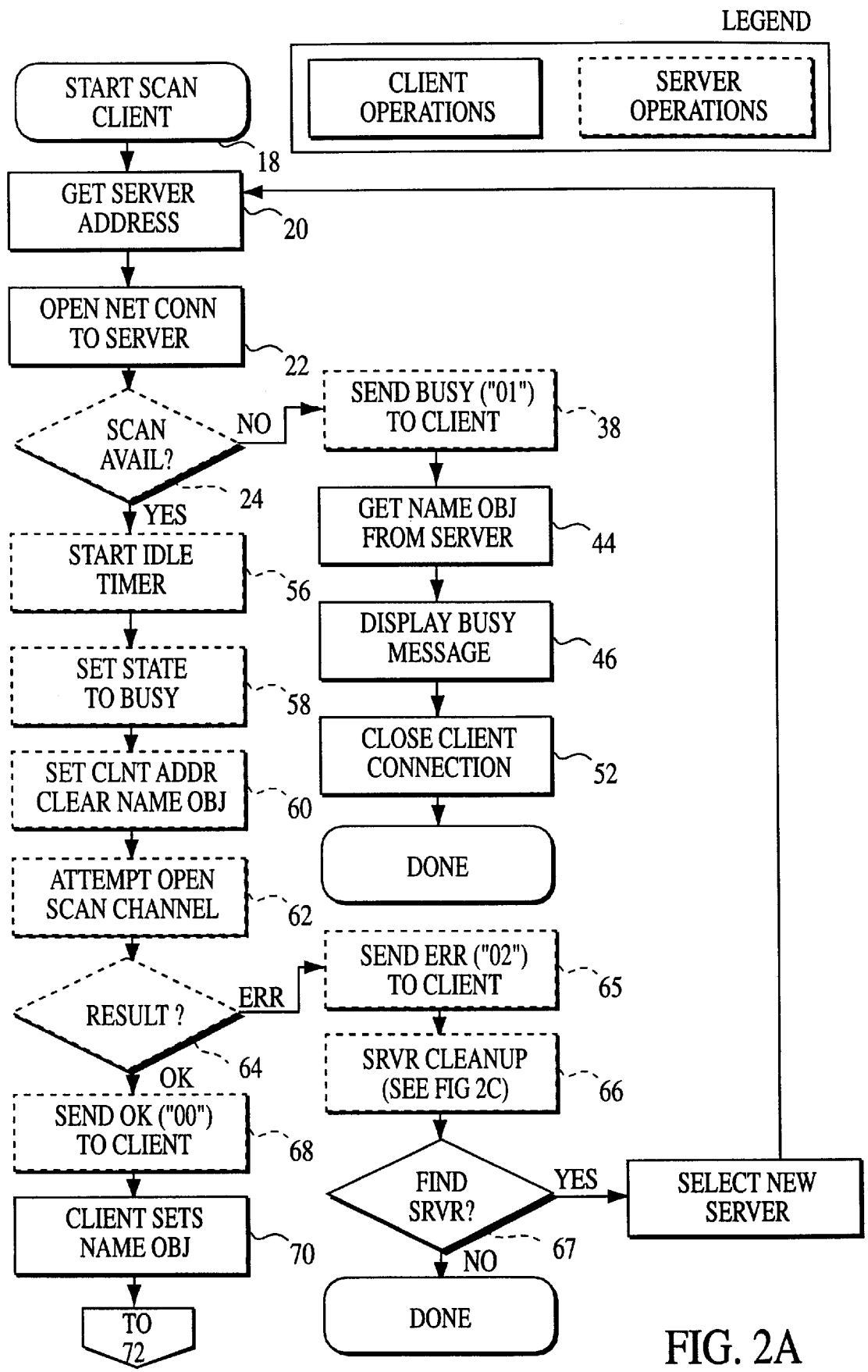
FIGS. 2A–2C are flow charts of the network server embodying the present invention.
Figure 2B:
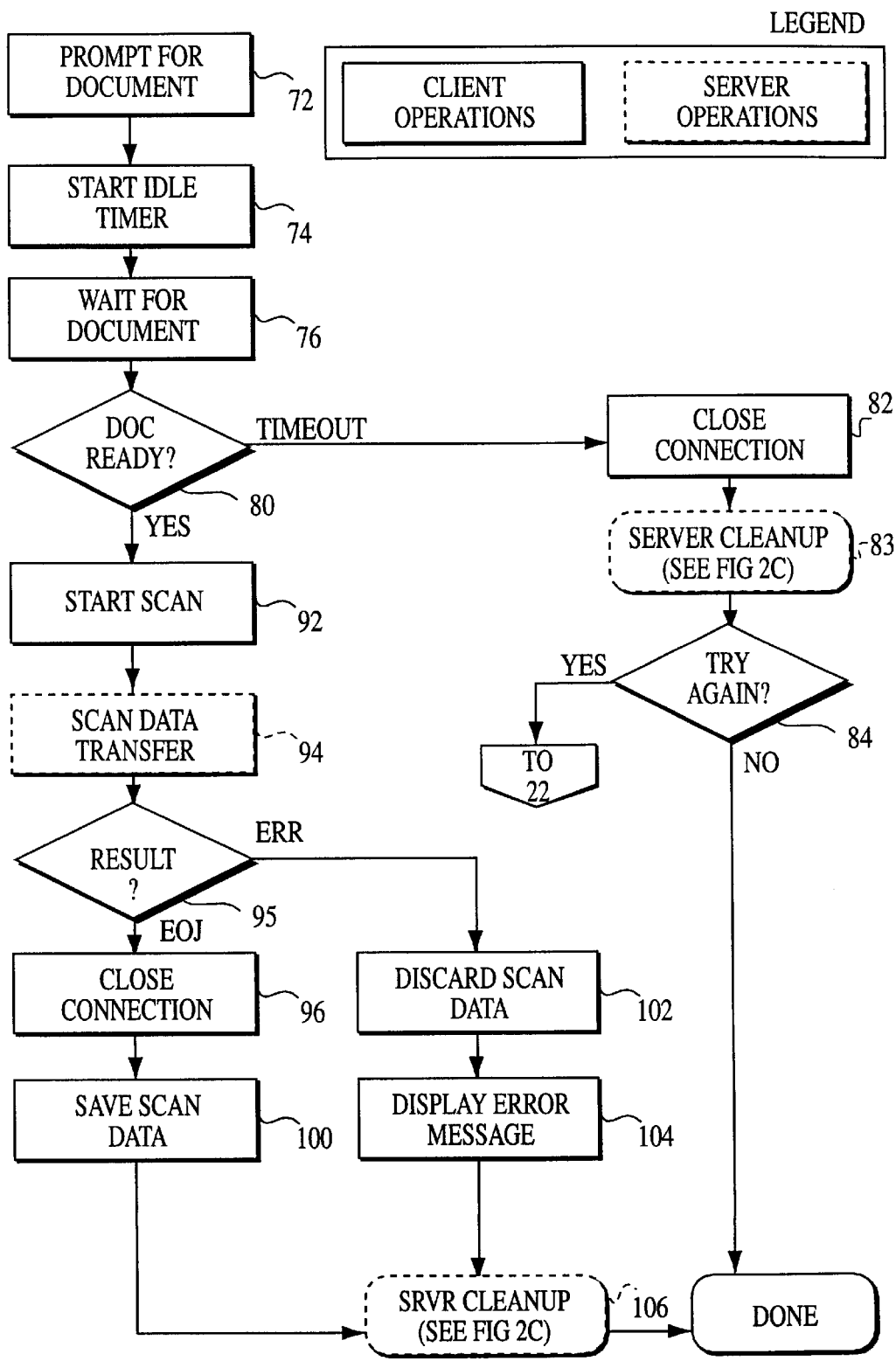

Referring to FIG. 2, a user prompts the client 12 to send a scan connection request to the server 10 scan port (block 18). The client discovers a new network scan server address or retrieves a previously stored address (block 20). A preferred discovery technique is disclosed in a commonly owned co-pending application to Kumpf et al. filed concurrently herewith and entitled Networked Peripheral Server Discovery Method. That application is incorporated by reference herein. After the client 12 sends the scan connection request to the server's scan port, the server 10 automatically accepts connection with the client 12, hence establishing a network connection between the client 12 and the server 10 through an exchange of data packets (block 22). After the client 12 has connected to the server 10, the server 10 checks the state of an internal state machine to determine whether or not the scanner is available (block 24).

Figure 3:
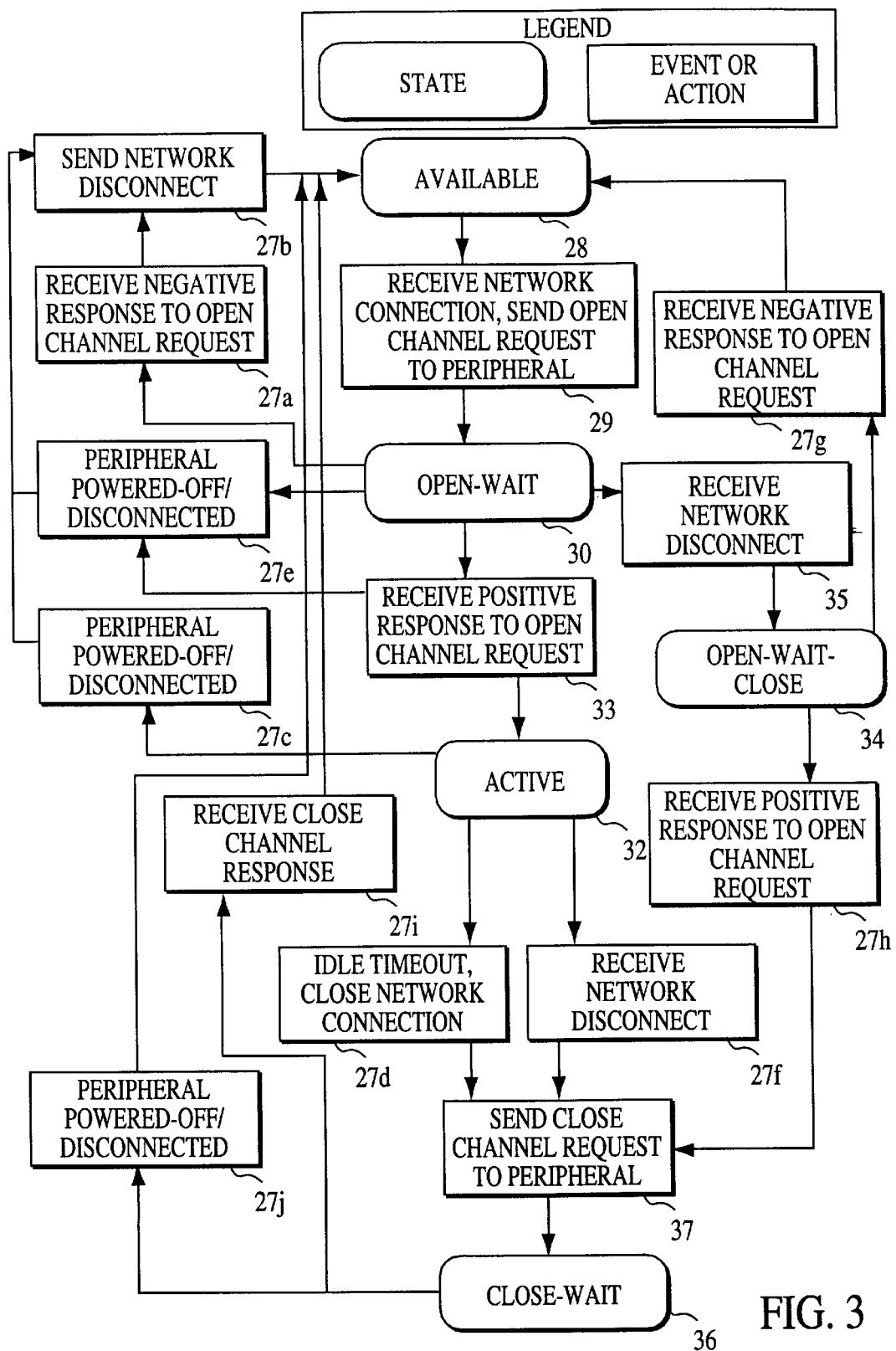
FIG. 3 is a flow chart of a state machine located in the server embodying the present invention.

The server 10 contains the state machine (shown in the flow chart of FIG. 3) which represents various internal states that key off external events (blocks 27a through 27j) to represent a current state of the scanner. For example, the internal state of the state machine changes from the scanner AVAILABLE state (block 28) to an OPEN-WAIT state (block 30) when the server 10 attempts to open a connection with the scanner (block 29). Likewise, the internal state changes from an OPEN-WAIT state (block 30) to an ACTIVE state (block 32) when the scan channel opens (block 33). An OPEN-WAIT-CLOSE state (block 34) occurs when a network connection is terminated (block 35) while waiting for the peripheral 16 to respond to an open scan channel request. A CLOSE-WAIT state (block 36) occurs when the server 10 sends a close scan channel request packet to the peripheral 16 (block 37).

Returning to FIG. 2, if the internal state of the server 10 is in any other state than available, the server 10 sends a scanner busy status, for example "01", to the client 12 (block 38). All scanner server statuses used herein are strings of two ASCII characters. "01" in ASCII is transferred as an octet with the value 48 in decimal followed by an octet with the value 49 in decimal. Other methods of encoding the status are apparent to one skilled in the art. Importantly, as the client 12 receives the result code from the server 10, a result of BUSY or "01" prompts the client 12 to obtain a current owner name from the server 10 (block 44), and display a BUSY message using the name (block 46). Preferably, the client 12 obtains the name by sending an SNMP query of a owner name management information base (MIB) object, however the server 10 could send the owner name MIB object over the network connection before the network connection is closed. By using the owner name MIB object the client's message can include the name of the current user. This enables the user attempting to open the connection locate the person currently using the scanner. It is recognized that in some situations this may be a security issue so the client software can provide an option not to supply a owner name MIB object. The server's 10 acquisition of the current owner name to set the owner name MIB object is discussed below. On the server's 10 side, after sending the BUSY message, the server 10 closes the network connection (block 52).

As the client 12 attempts to open a connection with the server 10, if the internal state of the server 10 represents that the scanner is not BUSY, then the server starts a server-idle-timer (block 56). The server-idle-timer acts so that one client 12 cannot tie up the scanner for more than a threshold time period without data being sent or received between the client 12 and the scanner before the server-idle-timer expires. A threshold time period of five minutes was found to be desirable but can be changed to suit the clients'12 needs. Since the scanner is not BUSY, the server 10 locks the scanner, i.e., prevents other clients 12 from using the scanner, by setting the scan status SNMP MIB object to the integer one to indicate that the scanner is BUSY (block 58). The server 10 also sets a scan owner address SNMP MIB object to the client's network 14 address and the scan owner name SNMP MIB object to an empty string (block 60). Thus, the client software can set the scan owner name SNMP MIB object so that other clients 12 can determine which client 12 has control of the scanner, as utilized above.

Thereafter, the server 10 attempts to establish communication with the scanner by opening a logical scan channel (block 62), and determines whether or not the scan channel connection was successful (block 64). The server 10 opens a communication channel to the peripheral for scanning. The preferred embodiment is a logical channel opened when needed and multiplexed with other logical channels used for other purposes, such as printing. However, if the peripheral does not support multiple channels across the communication link with the server, scanning is still possible, but other services will not be able to communicate at the same time. Also, the scan channel can be opened once at initialization and kept open between scan jobs. This is not preferred, however, because it ties up peripheral and server resources when there is no scan job in progress.

If the scan channel open request fails, then the server 10 returns, for example, 45 an ERROR "02" status string to the client 12 on the network connection as part of a data packet on the network connection to indicate that the scanner is not available (block 65). For example, the "02" status occurs if a cable connecting the server 10 to the scanner has detached or the peripheral 16 does not support scanning.

Figure 2C:
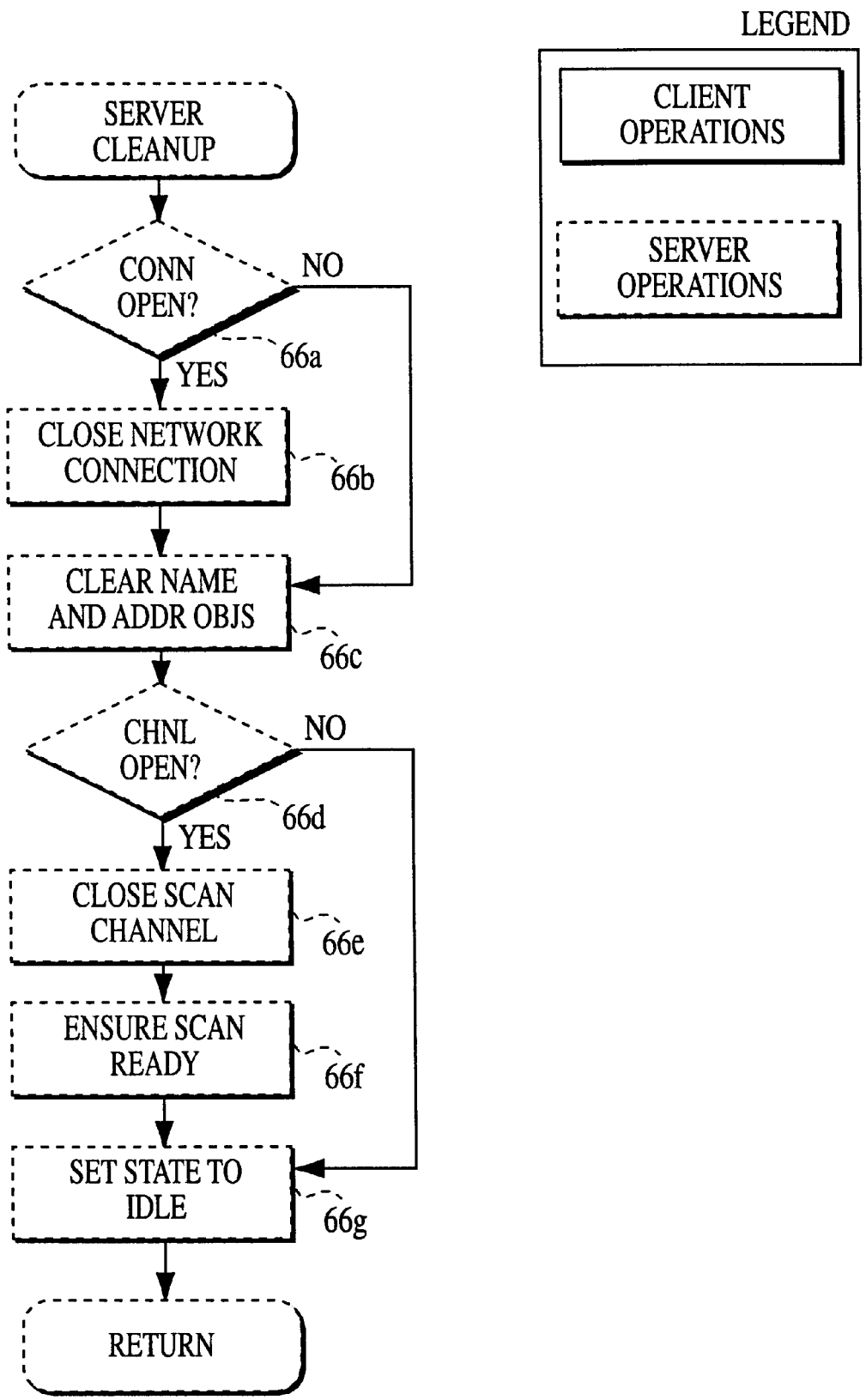

After the client 12 sends the data packet containing the status string, the server 10 invokes a cleanup subroutine as shown in FIG. 2C. The cleanup subroutine involves determining whether a network connection is open (block 66a). If the network connection is open, the server 10 closes the network connection with the client 12 by sending a packet to close the network connection (block 66b). Additionally, the server 10 clears the owner name and address SNMP MIB objects by setting the MIB objects to the empty string (block 66c). Next, the server 10 determines whether the scan channel is open (block 66d). Since the scan channel is not open at this stage in the method, the server 10 merely sets the scan status SNMP MIB object to the integer zero to indicate that the scanner is IDLE (block 66g).

While the server 10 performs the cleanup operation, the client 12 checks the data packet and displays an error message stating that the server 10 could not communicate with the scanner and prompts the user to determine if the user wishes to select another server 10 (block 67). If the user so indicates, the client invokes a process to select another server 10. The preferred process is the discovery method mentioned above (block 20).

If the scan channel opens successfully, however, the server 10 returns, for example, a "00" status string to the client 12 on the network connection indicating that the scanner is AVAILABLE (block 68). The client 12 receives the status code from the server 10, determines that the scanner is AVAILABLE, and sets the owner name SNMP MIB object on the server 10 (block 70). The client 12 provides a name that can be used by other clients 12 to inform users who are currently scanning. The preferred embodiment is to set an SNMP MIB object with the name of the user or client computer. At this point in time, the client 12 has effective ownership of the scanner, and can send scan control commands using in-band or out-of-band transmission channels and initiate one or more scans.

Thus, the client prompts the user to insert a document into the scanner (block 72). An alternate possibility is to skip this step if the client 12 can determine that a document is already inserted in the scanner. This is not preferred, however, because the client 12 may scan a document left in the scanner by a previous user. The client 12 begins a client-idle-timer set to expire for a time slightly less, for example ten seconds less, than the server-idle-timer (block 74). The client-idle-timer avoids a race condition where the server-idle-timer expires a new user begins to scan a document, but the current client 12 detects a change in scanner status and tries to start a scan intended for the new user.

After beginning the client-idle-timer, the client 12 periodically polls a scan button and paper insertion status on the peripheral 16 (block 76). In a preferred embodiment, the client checks for the document by polling an SNMP MIB object on the peripheral. In the preferred embodiment, the client detects the presence of the document to be scanned by checking for a user action on the client computer such as clicking a button; or checking for a user action on the peripheral such as pushing a SCAN button after loading the document; or checking a sensor in the peripheral that changes state when a document is loaded. It should be understood that some peripherals may not provide a button or sensor and that the client 12 software must be fashioned accordingly.

If the client-idle-timer expires, the client closes the network connection (block 82). On the server 10 side, the server 10 discovers that the client 12 has closed the network connection and invokes the cleanup subroutine shown in FIG. 2C (block 83). Thus, the server 10 sets the owner address and owner name SNMP MIB objects to the empty string (blocks 66c). Since the scan channel is open, the server 10 closes the scan channel (block 66e) and ensures that the scanner is in a ready state, i.e., performs any operations on the peripheral 16 necessary to ensure the peripheral 16 is in a known state and ready for the next scan job (block 66f). The exact operations are peripheral-specific and may not be required for some peripherals 16. A preferred error recovery technique is disclosed in a commonly owned co-pending application to Scoville et al. filed concurrently herewith and entitled Network Scan Server Ready State Recovery Method. That application is incorporated by reference herein. Additionally, the server 10 sets the scan status SNMP object to the integer zero to indicate that the scanner is IDLE (block 66g).

Thereafter, the client 12 displays an error message which notifies the user that the timer has expired, and prompts the user to decide whether the user would like to try to scan again (block 84). If the user desires to try another scan, the client 12 begins the operation by opening a network connection to the server (block 22). Otherwise, the operation is complete.

In the event the document is ready to scan (block 80), i.e., the user presses the scan button on the scanner, clicks the "continue" button on the client, or inserts the document into a self feed scanner. The client 12 begins the scan operation on the peripheral 16 (block 92). The client issues peripheral-specific commands to commence scanning the document. The server 10 transmits client data, typically scan commands, to the peripheral 16 and transmits peripheral data, typically scan image data, to the client 12 (block 94). The server-idle-timer is reset every time the server receives data from either the client or the peripheral. In normal operation the data transfer continues until the client 12 receives the complete scan job, the client 12 detects the end of the scan job, and closes the network connection (blocks 95, 96). The client 12 processes the image as requested by the user, for example, saving it to a file (block 100).

If the network connection closes unexpectedly, the client 12 discards the scan data (block 102) and displays an appropriate error message (block 104). Several error conditions can arise during the scan job, including loss of network communication, loss of peripheral communication, and the server-idle-timer expiring.

After the scan job ends, either normally or unexpectedly, the server 10 performs a cleanup operation (block 106). As shown in FIG. 2C, the server 10 closes the network connection with the client 12 (block 66b). Additionally, the server 10 sets the owner address and owner name SNMP MIB objects to the empty string (block 66c). The server 10 also closes the scan channel (block 66e), and invokes the scanner ready state operation as incorporated by reference above (block 66f). Furthermore, the server 10 sets the scan status SNMP object to the integer zero to indicate that the scanner is IDLE (block 66g).

From the foregoing description, it should be understood that an improved server 10 has been shown and described which has many desirable attributes and advantages. The present invention is able to provide an improved server 10 apparatus that can handle network 14 contention situations. Additionally, the present invention provides an improved server 10 which can recover to keep a client 12 from tying up a scanner for too long. Further, the present invention provides meaningful error messages to the client 12.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of supporting at least one peripheral in a network including at least one client with a general purpose software capability and a server connected to the peripheral, the method comprising steps of:

the server waiting for a client to attempt to open a connection with the peripheral;

the client sending a peripheral connection request to the server;

the server accepting connection with the client via exchange of data packets;

the server determining availability of the peripheral and locking the peripheral so that it cannot be used by other clients;

the server opening a connection with the peripheral if it is available and notifying the client of the peripheral availability;

the server waiting for predetermined data from the client, which when received, results in the client having control of the peripheral for at least a first predetermined time period;

the server waiting for data from the peripheral and when received sends the data to the client;

the server closing the connection with the client upon completion of sending the data to the client.

2. A method as defined in claim 1 wherein said peripheral is adapted to perform a scan operation.

3. A method as defined in claim 1 wherein said server/client connection is closed in the event no data is sent between the peripheral and the client within a second predetermined time period.

4. A method as defined in claim 3 wherein said predetermined time period is approximately 5 minutes.

5. A method as defined in claim 1 wherein the server includes an associated state machine, the server determining availability of the peripheral by checking its associated state machine.

6. A method as defined in claim 1 wherein said client attempts to establish a connection with the peripheral by sending a TCP/IP or SPX request to the server.

7. A method as defined in claim 1 wherein the server sends an unavailability status indication to the client in the event the peripheral is unavailable, the client then displays an error signal and the server closes the server/peripheral connection.

8. A method as defined in claim 3 wherein said server/client connection is closed by the client in the event predetermined peripheral operating conditions do not occur within a second predetermined time period.

9. A method as defined in claim 8 wherein said second predetermined time period is less than said first predetermined time period.

10. A method as defined in claim 8 wherein said predetermined peripheral operating conditions comprise one of detecting a scan operation being commenced and paper being inserted into the peripheral.

11. A method as defined in claim 1 wherein said peripheral availability determining step includes determining whether the peripheral has a busy status or an idle status.

12. A method as defined in claim 1 wherein said predetermined data comprises the client identification.

13. A method of supporting a scan peripheral on a network having at least one client with a general purpose software capability and a server connected to the peripheral, the method comprising steps of:

the server waiting for a client to attempt to open a connection with the peripheral;

the client discovering the address of the server;

the client sending a scan peripheral connection request to the server;

the server accepting connection with the client;

the server determining the busy or idle status of the peripheral and locking the peripheral when it has an idle status so that it cannot be used by other clients;

the server opening a connection with the peripheral if it is idle and notifying the client of the peripheral idle status;

the server waiting for predetermined data from the client which when received, results in the client having control of the peripheral for at least a first predetermined time period during which the client can initiate a scan operation by the peripheral;

the server waiting for data from the peripheral and when received sends the data to the client;

the server closing the connection with the client upon completion of sending the data to the client.

14. A method as defined in claim 13 wherein the server sets a server idle timer upon opening a connection with the client and with the peripheral, the server monitoring transfer of data between the peripheral and the client, and resetting said server idle time upon transfer of data between the same, and closing the connection with the peripheral in the event transfer of data does not occur within a second predetermined time period.

15. A server for supporting the operation of a scan peripheral connected in a network having at least one client with a general purpose software capability, the server being connected to the scan peripheral via the network, the server comprising:

means for responding to a client generated scan request and accepting a connection with the client;

means for accepting a connection from the client;

means for determining the busy or idle status of the peripheral and locking the peripheral when it has an idle status so that it cannot be used by other clients, and for opening a connection with the peripheral if it is idle and notifying the client of the peripheral idle status;

means for providing control of the peripheral for at least a first predetermined time period during which the client can initiate a scan operation by the peripheral responsive to the server receiving predetermined data from the client;

the server being adapted to wait for data from the peripheral and send the data to the client when received;

the server closing the connection with the client upon completion of sending the data to the client.

* * * * *